United States Patent
Park et al.

(10) Patent No.: US 9,177,414 B2
(45) Date of Patent: Nov. 3, 2015

(54) APPARATUS AND METHOD FOR RENDERING POINT CLOUD USING VOXEL GRID

(75) Inventors: Il Kyu Park, Daejeon (KR); Chang Woo Chu, Daejeon (KR); Youngmi Cha, Daejeon (KR); Ji Hyung Lee, Daejeon (KR); Bonki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 591 days.

(21) Appl. No.: 13/558,230

(22) Filed: Jul. 25, 2012

(65) Prior Publication Data

US 2013/0057653 A1    Mar. 7, 2013

(30) Foreign Application Priority Data

Sep. 6, 2011  (KR) .......................... 10-2011-0090281

(51) Int. Cl.
*G06T 17/00* (2006.01)
*G06T 15/04* (2011.01)

(52) U.S. Cl.
CPC ................ *G06T 15/04* (2013.01); *G06T 17/00* (2013.01); *G06T 2210/56* (2013.01)

(58) Field of Classification Search
CPC ...... G06T 15/04; G06T 17/00; G06T 2210/56
See application file for complete search history.

(56) References Cited

U.S. PATENT DOCUMENTS

| | | | |
|---|---|---|---|
| 5,542,032 A * | 7/1996 | Pritt ............................. | 345/421 |
| 7,420,555 B1 | 9/2008 | Lee | |
| 7,804,498 B1 | 9/2010 | Graham et al. | |
| 2007/0024620 A1 * | 2/2007 | Muller-Fischer et al. .... | 345/427 |
| 2008/0238919 A1 | 10/2008 | Pack | |
| 2011/0074785 A1 * | 3/2011 | Moriya ......................... | 345/427 |
| 2012/0245465 A1 * | 9/2012 | Hansegard et al. ........... | 600/443 |

OTHER PUBLICATIONS

Mario Botsch et al, "Efficient High Quality Rendering of Point Sampled Geometry", Proceedings of the 13$^{th}$ Eurographics Workshop on Rendering, 2002, pp. 53-64, Switzerland.

* cited by examiner

*Primary Examiner* — Kee M Tung
*Assistant Examiner* — Frank Chen

(57) ABSTRACT

A method for rendering point cloud using a voxel grid, includes generating bounding box including all the point cloud and dividing the generated bounding box into voxels to make the voxel grid; and allocating at least one texture plane to each of the voxels of the voxel grid. Further, the method includes orthogonally projecting points within the voxel to the allocated texture planes to generate texture images; and rendering each voxel of the voxel grid by selecting one of the texture planes within the voxel by using central position of the voxel and the 3D camera position and rendering using the texture images corresponding to the selected texture plane.

16 Claims, 4 Drawing Sheets

VOXEL          TEXTURE PLANE

APPARATUS AND METHOD FOR RENDERING POINT CLOUD USING VOXEL GRID

CROSS-REFERENCE TO RELATED APPLICATIONS

The present invention claims priority of Korean Patent Application No. 10-2011-0090281, filed on Sep. 6, 2011 which is incorporated herein by reference.

FIELD OF THE INVENTION

The present invention relates to rendering of point cloud; and more particularly, to a method and an apparatus for rendering point cloud using voxel grid, which are capable of rendering large-scale point cloud data generated by a three-dimensional (3D) laser scanner or the like into a screen and an image at an interaction possible speed.

BACKGROUND OF THE INVENTION

A method for corresponding points on three dimension to points on two dimension can be realized from the beginning of computer graphics as a basic technology of three-dimensional (3D) computer graphics. OpenGL that is a standard API (Application Program Interface) used to support hardware acceleration of 3D rendering in real time performs an operation of corresponding vertices to two-dimensional (2D) positions through a model-view-projection matrix and mapping each point on 3D to 2D, thereby performing the rendering.

The typical real-time 3D rendering uses a method based on a triangular mesh. A model defined by the triangular mesh on three dimension is transformed by a model-view-projection matrix and an inside of the transformed triangular is filled with textures. In this case, light is irradiated to the triangular to enhance reality. Currently used 3D graphic hardware may support acceleration of the 3D rendering and process a considerable amount of mesh in real time.

However, the point based rendering uses points instead of the triangular and therefore, needs not to use functions of filling the triangular with the textures or irradiating light thereto. As a result, hardware is inefficiently used. In addition, a plane point cloud method on three dimension that is represented by a single triangular provides representation using a large number of points and therefore, uses a larger number of points as compared with the triangular mesh based model. As a result, it is difficult for the plane point cloud method to render the point cloud model without effective algorithms even in high-performance 3D acceleration hardware. The software algorithms for accelerating the triangular mesh rendering may not be applied to the point cloud rendering based on the point rather than based on the plane.

As the method for accelerating the point cloud rendering, there are several algorithms. There have been used many methods for accelerating the point cloud rendering, such as a method for performing rendering by recovering planes of a 3D model from points to transform the recovered planes into a triangular mesh, a method for displaying only a small number of points on a screen by under-sampling each point using several method, a method for rendering only points of a required detail level according to a scale displayed on a screen by constructing points into hierarchical data structure, and a method for rendering adjacent points into a single splat by analyzing a single point based on a sample on a surface, and the like. These methods performs the rendering into other shapes such as a surface, small ovals, and points in consideration of the rendered results and have several different characteristics such as whether the 3D acceleration hardware is used, whether the rendering may be performed in the interaction possible speed, and the like.

Applications of a CAD type among applications handling the 3D point cloud handle points as points themselves and need to display points, not surfaces or splats, on a screen. Therefore, it difficult to use an algorithm of recovering points into planes or performing rendering and acceleration in the splat scheme in these environments, and the under-sampling method of displaying points as points or method of using and accelerating the hierarchical data structure may be used. In addition, the rendering needs to be performed in a rapid speed to implement the interaction.

SUMMARY OF THE INVENTION

In view of the above, the present invention provides a method and an apparatus for rendering point cloud using a voxel grid, which are capable of rapidly rendering the point cloud using hardware acceleration at an approximate level by dividing a space into 3D voxel grid and then, allocating a predetermined number of texture planes to each voxel in a voxel grid and generating an approximate rendered plane by orthogonally projecting points included in the voxel grid on each texture plane and then, rendering using texture images of texture plane approximating to a camera direction among texture planes of each voxel at the time of actually rendering.

In accordance with a first aspect of the present invention, there is provided a method for rendering point cloud using a voxel grid, including: generating bounding box including all the point cloud and dividing the generated bounding box into voxels to make the voxel grid; allocating at least one texture plane to each voxel of the voxel grid; orthogonally projecting points within the voxel to the allocated texture planes to generate texture images; and rendering each voxel of the voxel grid by selecting one of the texture planes within the voxel by using central position of the voxel and the 3D camera position and rendering using the texture images corresponding to the selected texture plane.

In accordance with a second aspect of the present invention, there is provided an apparatus for rendering point cloud using a voxel grid, including: a voxel grid generator configured to generate a bounding box including all the point cloud and divide the generated bounding box into the voxels to make the voxel grid; a texture plane generator configured to generate at least one texture plane to each voxel of the voxel grid; a texture image generator configured to orthogonally project points within each voxel of the voxel grid to the allocated texture planes to generate texture images; and a renderer configured to render each voxel of the voxel grid by a method of selecting one of the texture planes within the voxel by using central position of the voxel and a eye position of a camera for rendering the voxel and rendering using the texture images corresponding to the selected texture plane.

In accordance with the present invention, it is possible to effectively perform the approximate rendering on the large-scale point cloud and since the rendering speed is determined by the number of voxel grids rather than by the number of point, also possible to maintain the constant rendering speed even when the number of points is increased very largely.

Further, it is possible to displaying all the points on the screen by previously mapping all the points to the texture plane to generate the texture images without under-sampling all the points.

Further, it is possible to perform the accurate rendering at the predetermined distance or more since the rendering error of the point may not exceed ¼ of the voxel grid length.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings which form a part hereof.

Figure 1:
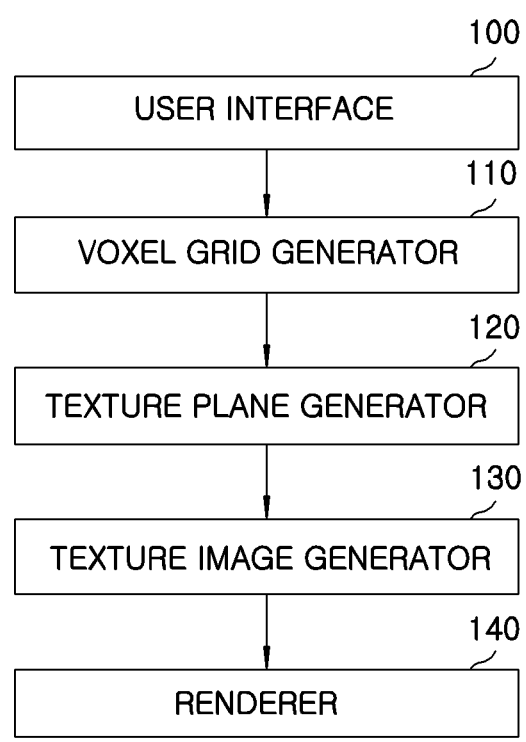
FIG. 1 is a block diagram of an apparatus for rendering large-scale point cloud using voxel grids in accordance with an embodiment of the present invention.

FIG. 1 is a block diagram of an apparatus for rendering large-scale point cloud using a voxel grid in accordance with an embodiment of the present invention. The rendering apparatus may include a user interface 100, a voxel grid generator 110, a texture plane generator 120, a texture image generator 130, and a renderer 140.

The apparatus for rendering large-scale point cloud in accordance with an embodiment of the present invention may provide the user interface 100 that may set parameters required to perform rendering. In this case, parameter values such as the number 'n' of voxels, the number 'm' of horizontal/vertical pixels of texture images, a threshold 't' determining whether to use the texture images of each voxel at the time of the rendering may be set through the user interface 100.

Figure 2:
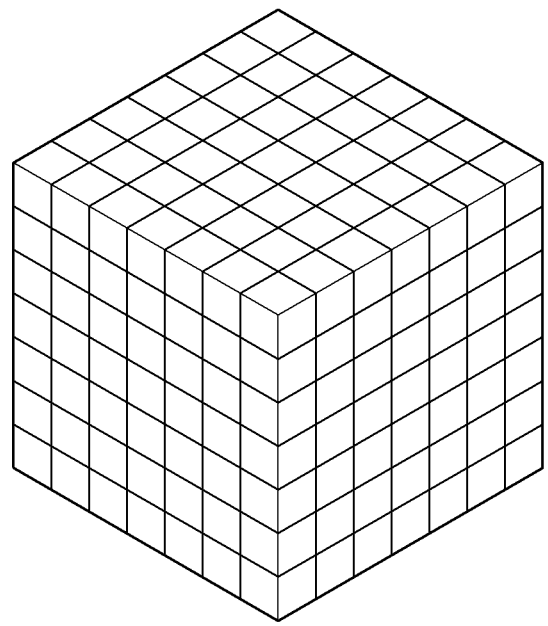
FIG. 2 is a diagram in which a space is divided into 3D voxel grids in accordance with the embodiment of the present invention.

The voxel grid generator 110 may generate a bounding box having a regular hexahedral shape that may include point cloud modes and then, divide the generated bounding box into the voxels. That is, as shown in FIG. 2, after regular hexahedral bounding box that may include all of the point cloud is generated, the generated bounding box is divided into n×n×n number of voxels to make the voxel grid having the regular hexahedral shape. In this case, the bounding box is obtained such that three directions of edges configuring the bounding box coincide with coordinate axes x, y, and z. Further, the number of the voxels 'n' is set by the user interface 100 and as 'n' is increased, the rendering results are accurate but the usage of memories for textures is increased. The point cloud may be included in a single voxel grid.

Figure 3:
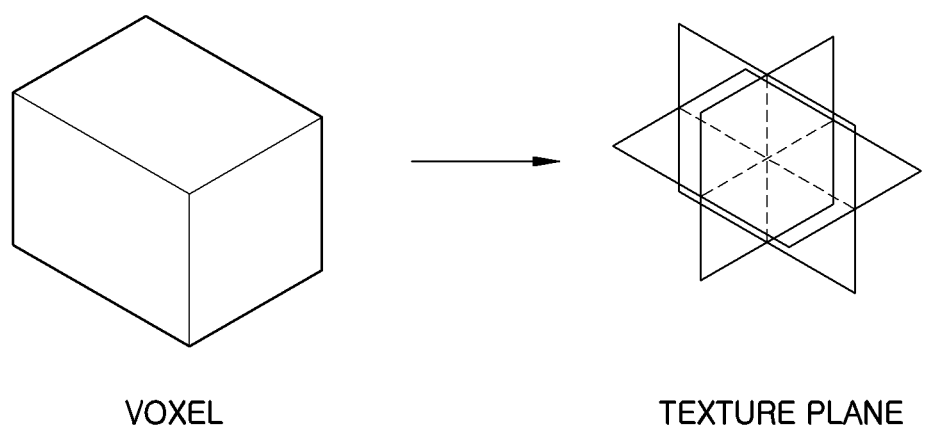
FIG. 3 is a diagram of texture planes allocated to a single voxel in accordance with the embodiment of the present invention.

The texture plane generator 120 may allocate one or more texture planes to each voxel. For example, as shown in FIG. 3, three texture planes may be allocated to each single voxel. In this case, the three texture planes pass through a center of the voxel and may be generated such that three axis directions of the voxel coincide with the normal direction, i.e., the vertical direction of each texture plane.

Since all the voxels have the same three axis directions (x, y, and z directions), each texture plane may be generated such that they meet the texture planes within the adjacent voxels. Each texture plane may be independently allocated to each voxel, but for the efficient management, all coplanar texture planes may be connected to allocate one big whole texture plane inscribing the bounding box and using each part belong to the voxel.

Further, the texture plane generator 120 may allocate a space for storing the texture images for each texture plane to the memories. In this case, a size of the texture image is formed in a square (m×m) and resolution 'm' may be set by the user interface 100. When the resolution 'm' is large, a small number of voxels may be used so that the positions of the points are inaccurate and the rendering speed is fast. On the other hand, when the resolution 'm' is small, a large number of voxels are used so that the positions of the points are more accurate.

Figure 4A:
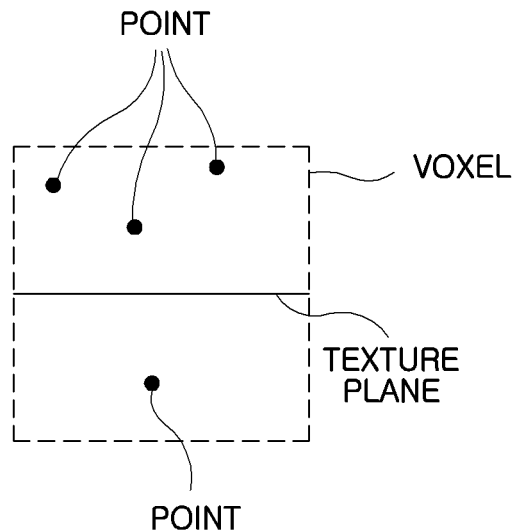
FIGS. 4A and 4B are diagrams for describing a process of orthogonally projecting points on the texture planes in accordance with the embodiment of the present invention.
Figure 4B:
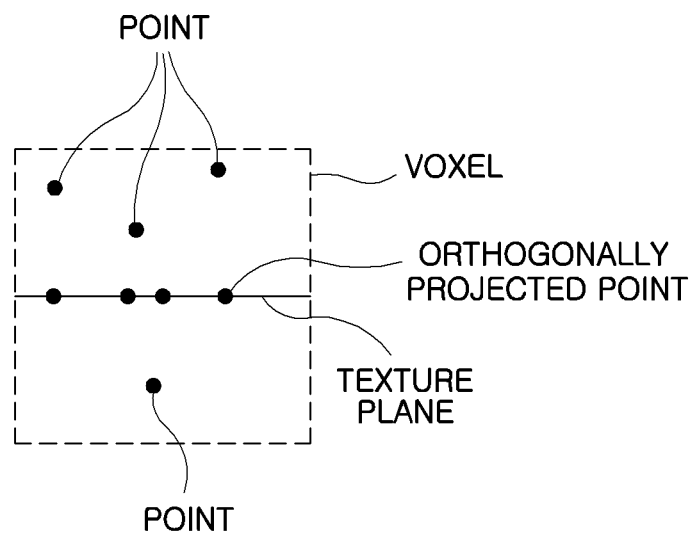

The texture image generator 130 may orthogonally project the points included within the single voxel to the texture planes to generate the texture images and store the generated texture images in the space allocated within the memory. That is, the three texture planes vertical to the three axis directions are present within the single voxel and the orthogonal projection is performed on the points for each texture plane. For example, as shown in FIG. 4A, when the points are present within the voxel, as illustrated in FIG. 4B, the texture images may be generated by orthogonally projecting the points within the voxel on the texture planes.

Describing the projection method for each texture plane, each position of the foot of the perpendicular from each point within the voxel to the texture plane is obtained, the points corresponding to the obtained each position are set as the projected points, thereby generating the texture images. In this case, colors of the points projected on the texture images are determined by using those of the points before being projected.

The texture images generated by the above-mentioned process may be stored in an allocated space within each memory.

The renderer 140 may perform the rendering by using the texture images stored in the memories and positional information of a camera and the description thereof is as follows.

First, when the single voxel is rendered, the distance between the camera position (eye position) and the voxel is calculated, and the rendering method is determined according to the ratio of the calculated distance to the size of the voxel. That is, the size representing one pixel of the texture plane on a screen is calculated according to the ratio of the calculated distance to the size of the voxel grid. When the size is larger than the threshold 't', the texture planes are not used and all of the points within the voxel are rendered by the general rendering method. On the other hand, when the size is smaller than the threshold 't', the texture plane is rendered by the following method to render the approximate value of the point cloud.

Figure 5:
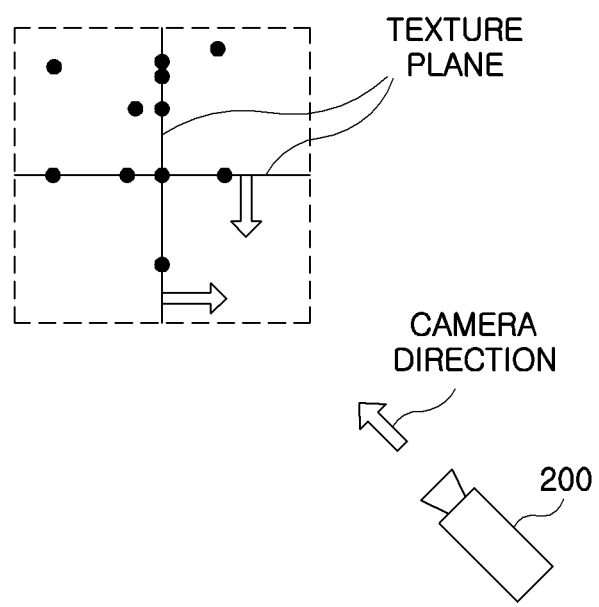
FIG. 5 is a diagram for describing a process of determining the texture planes to be rendered in accordance with the embodiment of the present invention.

As shown in FIG. 5, the process of rendering the single voxel calculates a vector between the position of a 3D camera 200, i.e., eye position and a central position of the voxel to calculate the camera direction of the 3D camera 200 and calculate an angle formed by the calculated camera direction and the three texture planes within the voxel. Since the texture plane with the largest angle is the closest plane to the vertical plane of the camera direction, that texture plane is used to approximately render the point clouds in the voxel.

Here, rendering each voxel of the voxel grids is performed by rendering a quad of four vertices defining the texture planes having the largest value among the angle of each of the calculated texture planes.

Further, when the rendering 140 is preformed, the texture images are rendered by turning-off a "depth test" function and using an "alpha (transparency) test" function and when rendering the single texture plane, the single texture plane is rendered by the quad of four vertices defining the texture planes and is rendered by mapping the previously generated texture images. In this case, when a "depth test" function is turned-off, the pixels on the screen are formed by using only the alpha (transparency).

The entire rendering is performed by applying the rendering method of each voxel to all of the voxels. In "perspective projection" setting, the vector toward the center of the voxel at the camera position for 3D rendering is different for each voxel and thus, the rendering is performed by calculating the texture plane to be used for each voxel. If rendering is performed in "orthogonal projection", the angle formed by the camera direction and three texture planes are the same irrespective of the voxel and therefore, the angle calculation is performed only once and the rendering may be performed by using the texture planes with the same direction in all the voxels.

As described above, in accordance with the embodiment of the present invention, it is possible to effectively perform the approximate rendering on the large-scale point cloud. Further, the rendering speed is determined by the number of voxels rather than the number of points so that even when the number of points is increased very largely, the constant rendering speed may be maintained.

Further, it is possible to display all the points on the screen by previously mapping all the points to the texture plane to generate the texture images without under-sampling all the points.

Further, since the rendering error of the point cannot exceed ¼ of the voxel length, it is possible to perform the accurate rendering at the predetermined distance or more.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for rendering point cloud using a voxel grid, comprising:
    generating bounding box including all the point cloud and dividing the generated bounding box into voxels to make the voxel grid;
    allocating at least one texture plane to each voxel of the voxel grid;
    orthogonally projecting points within the voxel to the allocated texture planes to generate texture images; and
    rendering each voxel of the voxel grid by selecting one of the texture planes within the voxel by using central position of the voxel and the 3D camera position and rendering using the texture images corresponding to the selected texture plane.

2. The method of claim 1, wherein the bounding box is generated in a regular hexahedral shape such that three directions of edges configuring the bounding box coincide with coordinate axes.

3. The method of claim 2, wherein said dividing the generated bounding box into voxels to make the voxel grid is performed such that the bounding box having the regular hexahedral shape is divided into n×n×n number of the voxels to make the voxel grid having the regular hexahedral shape based on a constant defined by a user.

4. The method of claim 1, wherein said allocating at least one texture plane is performed such that three texture planes are allocated to each voxel of the voxel grid.

5. The method of claim 4, wherein the three texture planes pass through the center of the voxel and are vertical to each of the three axis directions of the voxel.

6. The method of claim 1, wherein said allocating at least one texture plane is performed such that a whole texture plane inscribed to the bounding box of the voxel grid is first allocated, and the part of the texture plane belonging to the voxel is used as the texture plane.

7. The method of claim 1, wherein said rendering each voxel of the voxel grid includes:
    calculating a distance between the central position of the voxel and the eye position of the 3D camera; and
    performing the rendering using the texture planes by comparing the distance with a preset threshold.

8. The method of claim 7, wherein when the distance is larger than the preset threshold, all the points within the voxel grids are rendered and when the distance is smaller than the present threshold, the rendering is performed by using the texture planes.

9. The method of claim 7, wherein said rendering each voxel of the voxel grid includes:
    calculating the camera direction by calculating a vector between the central position of the voxel and the eye position of the 3D camera;
    calculating angles formed by the camera direction and each texture plane of the voxel; and
    performing the rendering by selecting the texture plane having the largest value among the angle of each of the calculated texture planes.

10. The method of claim 9, wherein said rendering each voxel of the voxel grid is performed by rendering a quad of four vertices defining the texture planes having the largest value among the angle of each of the calculated texture planes.

11. The method of claim 7, wherein when performing the rendering, the rendering is performed by turning-off a "depth test" function and using only an "alpha test" function.

12. An apparatus for rendering point cloud using a voxel grid, comprising:
    a processor and a memory;
    wherein the processor and the memory are configured to implement:
    a voxel grid generator to generate a bounding box including all the point cloud and to divide the generated bounding box into the voxels to make the voxel grid;

a texture plane generator to generate at least one texture plane to each voxel of the voxel grid;

a texture image generator to orthogonally project points within each voxel of the voxel grid to the allocated texture planes to generate texture images; and a renderer to render each voxel of the voxel grid by selecting one of the texture planes within the voxel by using central position of the voxel and an eye position of a camera for rendering the voxel and by using the texture images corresponding to the selected texture plane.

13. The apparatus of claim 12, wherein the texture plane generator generates at least one of whole texture planes inscribed to the bounding box and allocates a part of the whole texture planes to the voxel.

14. The apparatus of claim 12, wherein the renderer calculates a distance between the central positions of the voxel and the eye position of the camera; and performs the rendering using the texture planes by comparing the calculated distance with a preset threshold.

15. The apparatus of claim 14, wherein the renderer renders all the points within a voxel when the distance is larger than the preset threshold and performs the rendering using the texture planes when the distance is smaller than the preset threshold.

16. The apparatus of claim 14, wherein the renderer calculates the camera direction by calculating a vector between the central position of the voxel and the eye position of the camera, calculates an angle formed by the camera direction and each texture plane of the voxel, and performs the rendering by selecting the texture plane having the largest value among the angle of each of the texture planes.

\* \* \* \* \*